United States Patent [19]

Odsgard

[11] Patent Number: 4,488,654

[45] Date of Patent: Dec. 18, 1984

[54] STAND FOR SUPPORTING SUBSTANTIALLY CONICAL OBJECTS AS WELL AS A CARRIER PREFERABLY FOR USE IN CONNECTION WITH THIS STAND

[75] Inventor: Peter Odsgard, Glostrup, Denmark

[73] Assignee: Odsgard Reklame/Marketing ApS, Glostrup, Denmark

[21] Appl. No.: 444,595

[22] PCT Filed: Mar. 25, 1982

[86] PCT No.: PCT/DK82/00025

§ 371 Date: Nov. 23, 1982

§ 102(e) Date: Nov. 23, 1982

[87] PCT Pub. No.: WO82/03373

PCT Pub. Date: Oct. 14, 1982

[51] Int. Cl.³ .............................. B65H 19/00
[52] U.S. Cl. ........................ 312/39; 211/73; 221/279; 229/DIG. 7; 242/55.3; 312/244
[58] Field of Search ............... 312/244, 39; 211/60 R, 211/72, 73; 229/DIG. 7; 221/279; 242/55.53, 55.3

[56] References Cited

U.S. PATENT DOCUMENTS

| | | | |
|---|---|---|---|
| 463,256 | 11/1891 | Side | 221/279 |
| 1,262,741 | 4/1918 | Brady | 242/55.3 |
| 1,367,174 | 2/1921 | Botnen . | |
| 1,448,866 | 3/1923 | Redoute | 229/DIG. 7 |
| 1,528,620 | 3/1925 | Kuwahara et al. | 229/DIG. 7 |
| 1,627,583 | 5/1927 | Thum | 229/DIG. 7 |
| 1,632,265 | 6/1927 | Axberg | 242/55.3 |
| 1,702,199 | 2/1929 | Cunningham | 227/DIG. 7 |
| 1,908,115 | 5/1933 | Chadwick | 221/279 |
| 2,321,519 | 6/1943 | Rubinoff | 229/DIG. 7 |
| 2,513,762 | 7/1950 | Tyson, Jr. | 229/DIG. 7 |
| 2,567,054 | 9/1951 | Clement et al. | 211/72 |
| 3,094,259 | 6/1963 | Diehl | 229/DIG. 7 |
| 3,184,053 | 5/1965 | Eldridge | 242/55.53 |
| 3,499,538 | 3/1970 | Sherard . | |

FOREIGN PATENT DOCUMENTS

| | | | |
|---|---|---|---|
| 125981 | 3/1973 | Denmark . | |
| 535565 | 8/1930 | Fed. Rep. of Germany | 211/72 |
| 1466345 | 9/1965 | France | 242/55.3 |

Primary Examiner—William E. Lyddane
Assistant Examiner—Thomas A. Rendos
Attorney, Agent, or Firm—Cushman, Darby & Cushman

[57] ABSTRACT

A stand supporting ice-cream cones comprises an upper dispensing plate (2) with a plurality of apertures (3), in which the ice-cream cones may be temporarily supported before they are to be carried away. A container (6) is provided beside the dispensing plate (2) and comprises a pile (9) of carriers, whereby each carrier (7) comprises a plurality of apertures and may serve to carrying away the conical objects (4). The carriers may be dispensed one by one from the container (6). Immediately upon the dispensing of each carrier (7), said carrier is situated on the dispensing plate (2), whereafter the ice-cream cones to be supported before the carrying away are situated in the apertures of the carrier and the stand. Because of the container a carrier is always available when one or more ice-cream cones are to be carried away from the stand. A carrier preferably for use in connection with the stand (1) comprises a plate (7) of bendable cardboard with a carrier part. The carrier part comprises a plurality of apertures receiving the ice-cream cones (4). The plate (7) may be folded immediately before the carrying away from the stand in such a manner that it is triangular in cross section, the apex of the triangle pointing upwards. The folded legs (15) of the plate comprises handles (19).

15 Claims, 13 Drawing Figures

STAND FOR SUPPORTING SUBSTANTIALLY CONICAL OBJECTS AS WELL AS A CARRIER PREFERABLY FOR USE IN CONNECTION WITH THIS STAND

TECHNICAL FIELD

The invention relates to a stand for supporting substantially conical objects such as ice-cream cones or disposable cups, and comprising an upper dispensing plate with a plurality of apertures, in which the objects may be situated.

BACKGROUND ART

Stands are known, in which ice-cream cones may be stationarily situated, and which are formed as a plinth and provided with a plurality of apertures in the dispensing plate arranged at the top thereof. However, these stands are not suited for retaining a carrier for carrying away ice-cream cones.

Carriers are also known, cf. for instance DK-PS No. 125,981, whereby objects, especially bottles, in a group may be manually transported, and whereby the objects are retained in apertures in the carrier. These carriers are, however, not suited for carrying away conical, delicate objects such as ice-cream cones.

Furthermore a carrier is known which is formed as a stand, and which on the top side comprises recesses receiving fast food such as for instance chips, burgers, and a bottle with a beverage. However, this carrier is only used when having the meal on the spot.

DISCLOSURE OF INVENTION

The object of the present invention is to provide a stand of the above type, which always ensures that the carriers are available when the objects are to be carried away, and which at the same time ensures that the carriers are reliably situated on the top side of the stand when the conical objects are to be supported on said stand before their being carried away.

The stand according to the invention is characterized in that it comprises a container for carriers provided with apertures and for carrying away the conical objects, said container being adapted to dispense the carriers one by one since these carriers are to be situated on the dispensing plate of the stand before the conical objects are situated on the stand. As a result, the carriers are always available at the stand. When a carrier is pulled out of the container and situated on the dispensing plate, care is automatically taken that the apertures of the carrier oppose the apertures of the dispensing plate. When the conical objects to be delivered from the stand are temporarily situated in the apertures of the carrier and the dispensing plate, the carrier is fixed to the dispensing plate.

According to the invention the stand may comprise a container which is formed as a box with an upper side slot through which the carriers may be pulled out one by one, said carriers being present in a roll or a spring-loaded pile within the box, whereby stops are provided at one end of the dispensing plate, whereby each carrier may abut on and be retained by said stops immediately upon its pulling out of the container. In this manner both a reliable support of the carriers and a good retaining thereof are obtained.

Furthermore according to the invention, the container may be mounted below the dispensing plate in such a manner that the distance between the top side of the container and the underside of the dispensing plate is greater than the distance which the conical objects project below said dispensing plate, as well as one or more slots for the removal of the carriers are provided on the side plates of the stand, whereby a more compact stand construction is obtained.

According to the invention the upper or lower part of the slot may comprise a rim which is preferably serrated in order to ease the tearing off of carriers, whereby a reliable tearing off of each carrier from the container roll is possible.

The invention also relates to a carrier, preferably for use in connection with the stand according to the invention, and this carrier is characterized in that it comprises a plate of bendable material such as cardboard and with a plurality of preferably equally large apertures situated side by side and receiving the conical objects such as ice-cream cones and disposable cups, said plate being foldable immediately before the carrying away from the stand in such a manner that it is substantially U-shaped or triangular in cross section, the cavity of the U or the apex of the triangle facing upwards, and that the free legs of the U comprise handles, e.g. in the form of handle holes. In practice this carrier proved to be especially efficient in connection with the stand according to the invention. This carrier may, however, also be used without this stand.

An embodiment of the carrier is characterized in that it comprises at least two parallel folding lines, about which the free legs of the carrier may be folded substantially into the shape in which it is carried away, whereby a particularly advantageous embodiment is obtained.

The plate material may according to the invention be of such a nature and the folding lines be formed in such a manner that the free legs of the carrier plate allow a folding of substantially 90° downward relative to the horizontal carrier part and subsequently a folding of substantially 180° in the opposite direction. As a result, the carrier immediately upon its arrangement on the stand may have the outer parts of its free legs folded below the stand in such a manner that the carrier is appropriately fixedly situated relative to the stand, when the conical objects are to be situated in the carrier plus the stand.

Furthermore according to the invention, an auxiliary folding line is provided on each free leg below each handle hole in such a manner that the outer portions of the free legs may be made abutting each other in a face to face manner when the carrier is carried away. In this manner a more reliable grip about the carrier during the carrying away of the conical objects is obtained, the outer parts of the free legs being made abutting each other face to face.

According to the invention, the carrier may comprise apertures of a diameter within the range 0.3 to 0.6 times the width of the carrier part, and the rim of each aperture comprise a plurality of cuts for partially allowing the carrier material to clamp each of the objects at their situating within the apertures, whereby the carrier part is provided with a sufficient strength.

Moreover according to the invention, the carrier may be of a laminate of plastics and cardboard, whereby the plastics is sprayed onto the cardboard as a mist. As a result, the carrier is appropriately hygienic since it has a tendency to reject dirt.

The carrier according to the invention may furthermore be characterized in that the ratio of the width of the inner part of the free legs to the width of the carrier part is at least 1.3, whereby a particularly good strength is obtained.

Finally according to the invention a for instance loose cover plate may be provided on the top side of the carrier part, said cover plate being of the same dimensions as the carrier part and comprising apertures with their centres at the same places as in the carrier part, said apertures, however, being smaller in the cover plate than in the carrier part. In this manner the carrier may be used for relatively small conical objects. The diameter of the apertures of the cover plate must, however, always be larger than the largest diameter of the objects.

BRIEF DESCRIPTION OF DRAWINGS

The invention will be described below with reference to the accompanying drawing, in which.

BEST MODE OF CARRYING OUT THE INVENTION

Figure 1:
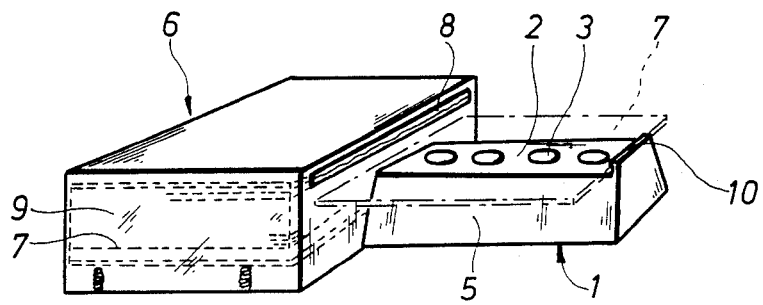
FIG. 1 is a perspective view of a first embodiment of a stand with associated container containing a pile of carriers according to the invention.
Figure 4:
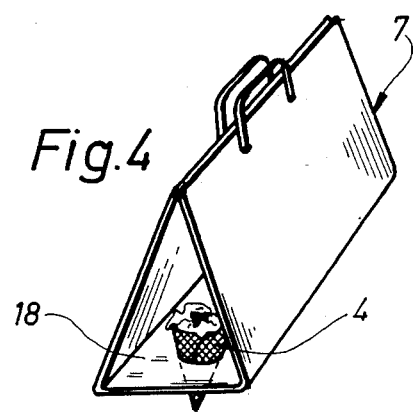
FIG. 4 illustrates the carrier of FIG. 3, but folded.

The stand 1 illustrated in FIG. 1 is preferably shaped as a plinth and comprises an upper dispensing plate 2 with a plurality of apertures 3, in which substantially conical objects 4, cf. FIG. 4, may be arranged. The stand furthermore comprises inclined side walls 5. The conical objects 4 may for instance be ice-cream cones and disposable cups, which for instance may contain a burger, a piece of chicken, pommes frites or a beverage.

The stand 1 comprises a container 6 for the carriers 7 provided with apertures for the carrying away of the conical objects 4. The container 6 is adapted to deliver the carriers 7 one by one, said carriers being arranged on the dispensing plate 2 of the stand 1 before the arrangement of the conical objects 4 on said stand 1.

The container 6 is formed as a box with an upper side slot 8, through which the carriers 7 may be pulled out one by one, since they are situated in a spring-loaded pile 9 within the box. A stop or stops 10 are provided at one end of the dispensing plate 2, and each carrier 7 may be made abutting said stops immediately after they have been pulled out of the container 6. In this manner both a reliable support of the carriers 7 and a good retaining thereof are obtained.

Figure 2:
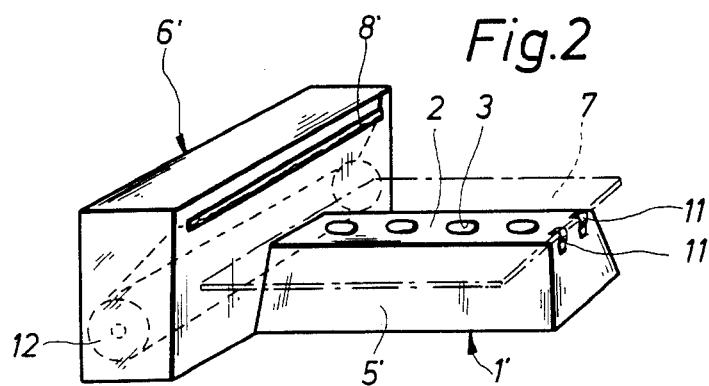
FIG. 2 illustrates a second embodiment of the stand with associated container containing a roll.

FIG. 2 illustrates a modified stand 1' comprising a container 6'. Stops in the form of spring-loaded clamps 11 are provided at one end of the dispensing plate 2. Each carrier 7 may be made abutting with and retained by these stops. The container 6' differs from the container 6 of FIG. 1 in that instead of a pile 9 of carriers 7, a roll 12 of attached carriers 7 is used.

Figure 7:
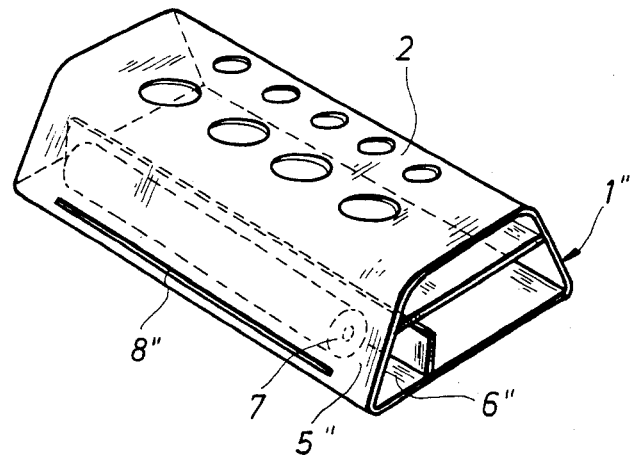
FIG. 7 illustrates a third embodiment of the stand with associated container comprising a roll.

FIG. 7 illustrates a third embodiment of a stand 1" with associated container 6". The container 6" is mounted below the dispensing plate 2 in such a manner that the distance between the top side of the container 6" and the underside of the dispensing plate 2 is larger than the distance which the conical objects 4 project below the dispensing plate 2. On the side plates 5" of the stand 1", one or more slots 8" are provided for the removal of the carriers 7. Such an embodiment provides a more compact stand construction. Within the container 6", the carriers 7 are situated in a roll, from which said carriers may be pulled out through a slot 8" situated in the side plate 5" of the stand 1".

In the upper or lower part of the slot 8' of FIG. 2 or the slot 8" of FIG. 7, a preferably serrated tear-off rim may be provided. In this manner a reliable tearing off of each carrier 7 from the container roll is obtained.

Figure 10:
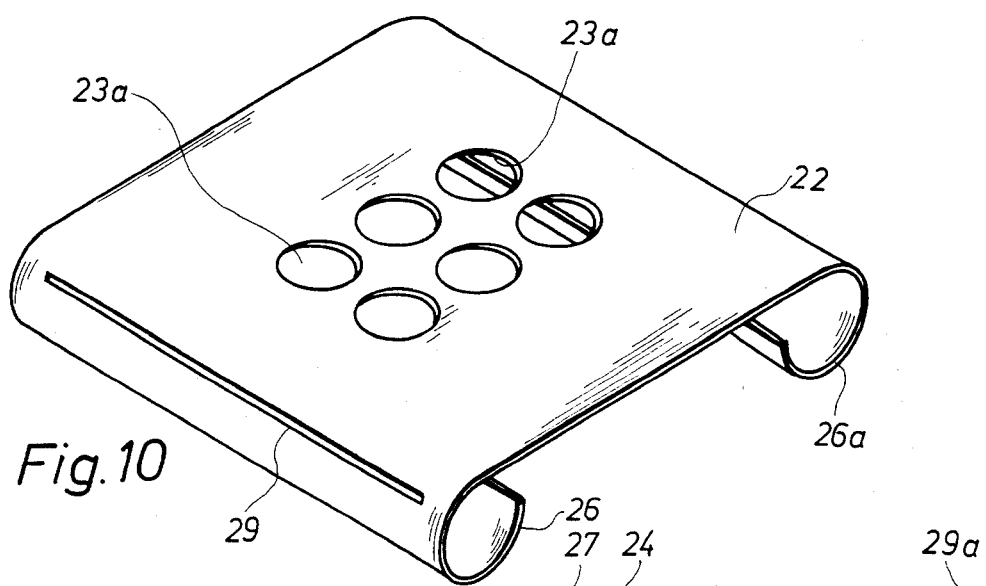
FIG. 10 illustrates a further embodiment of the stand according to the invention, wherein a container for the carriers as well as a corresponding auxiliary container for such carriers are situated immediately below the dispensing plate of the stand.
Figure 12:
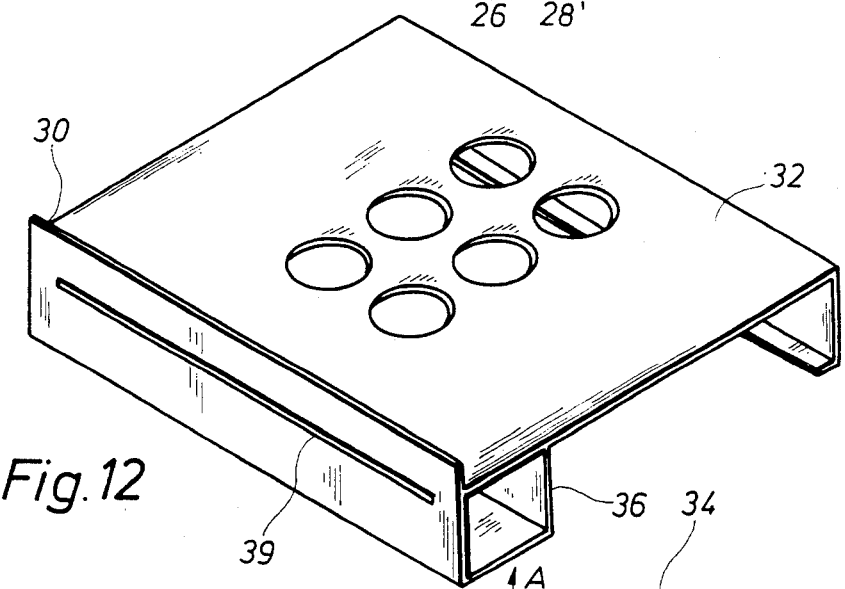
FIG. 12 illustrates a further embodiment of the stand, wherein a container for the carriers is situated immediately below the dispensing plate and parallel to a stop on the dispensing plate of the stand.

FIG. 4 illustrates a carrier 7 preferably for use in connection with the stand 1 of FIG. 1 or 1' of FIG. 2 or 1" of FIG. 7 or the stands of FIGS. 10 and 12. The carrier 7 comprises a plate of bendable material such as cardboard and with a plurality, preferably equally large, of apertures 13 situated side by side and receiving the conical objects 4, cf. FIG. 4. This plate may be folded immediately before a user carries it away from the stand in such a manner that it is substantially U-shaped or triangular in cross section, whereby the cavity of the U or the apex of the triangle points upwards, cf. FIG. 4.

In FIG. 4, the carrier 7 comprises a pair of handles at its upper rim when folded, said handles in an appropriate manner being secured to the carrier 7.

Figure 3:
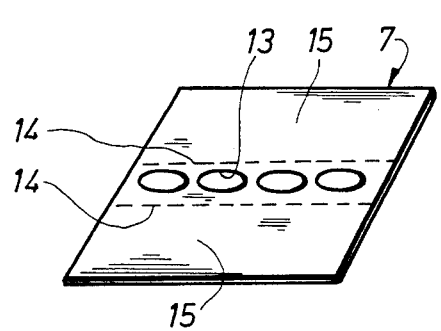
FIG. 3 illustrates a carrier according to the invention with a pair of folding lines, but not folded.

The carrier 7 of FIG. 3 comprises two parallel folding lines 14, about which the free legs 15 of the carrier 7 may be folded substantially into the form in which it is carried away.

Figure 6:
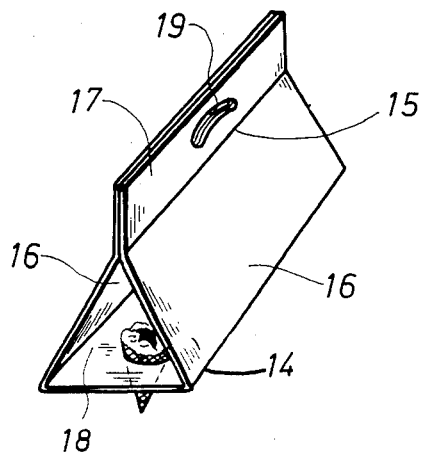
FIG. 6 illustrates the carrier of FIG. 5, but folded.
Figure 5:
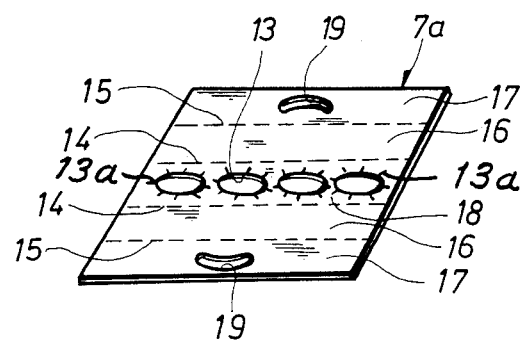
FIG. 5 illustrates a second embodiment of the carrier according to the invention with two pairs of folding lines, but not folded.

FIGS. 5 and 6 illustrate an modified embodiment of the carrier 7a, since beyond the folding lines 14 it comprises two auxiliary folding lines 15, about which the free legs 16 and 17, respectively, of the carrier 7a may be folded. This carrier is besides provided with handle holes 19.

Figure 8:
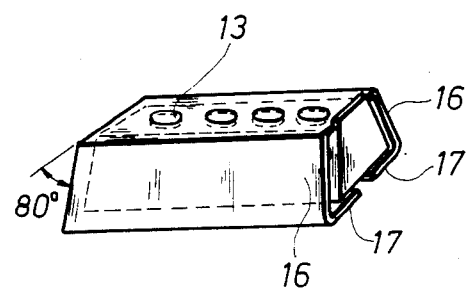
FIG. 8 illustrates the embodiment of FIG. 7, wherein a carrier has been situated on the stand, and the outer part of the free legs of the carrier have been folded below the stand.

The plate material of the carrier is of such a nature and the folding lines are formed in such a manner that the free legs of the carrier plate allow a folding of substantially 90°, e.g. 80°, downward relative to the horizontal part 18 of the carrier plate and subsequently a folding of substantially 180° in the opposite direction. The folding of 90° downward and below the stand is performed as illustrated in FIG. 8. When the conical objects to be delivered have been situated on the carrier, the free legs 17 are folded 180° upwards, and the outer parts of the free legs are then made abutting each other face to face, cf. FIG. 6, in such a manner that the carrier is ready to be carried away from the stand.

The apertures 13 of the carrier are preferably of a diameter within the range of 0.3 to 0.6 times the width of the carrier, and the rim of each aperture 13 is provided with a plurality of cuts 13a for partial clamping of each object when said objects are situated in the apertures 13. In this manner the carrier is provided with sufficient strength.

The carrier may be made of cardboard or a laminate of cardboard and plastics formed by spraying the plastics onto the cardboard as a mist. As a result, the carrier may be made appropriately resistant to moisture-releasing left-overs.

Furthermore, the carrier may be dimensioned in such a manner that the ratio of the width of the inner part of the free legs 16 to the width of the carrier part 18 is at least 1.3.

Figure 9:
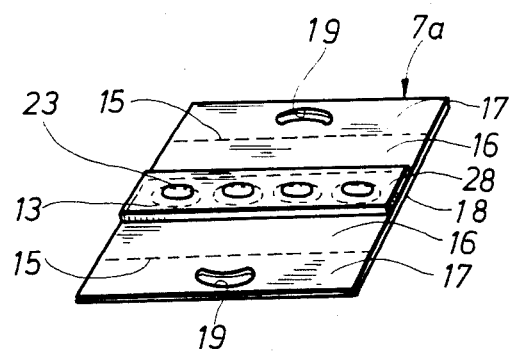
FIG. 9 illustrates a carrier, a cover plate with apertures smaller than the apertures of the carrier part being situated on said carrier part.

As indicated in FIG. 9, a cover plate 28 may be arranged on top of the carrier part 18 of a carrier 7a. The apertures 23 of this cover plate have their centres in register with the centres of the apertures 13 of the carrier part, said apertures of the cover plate, however, being of a smaller diameter than the diameters of the apertures 13. The carrier may then easily be used for carrying very small objects. The diameter of the apertures 23 must always be smaller than the largest diameter of the conical objects.

Figure 11:
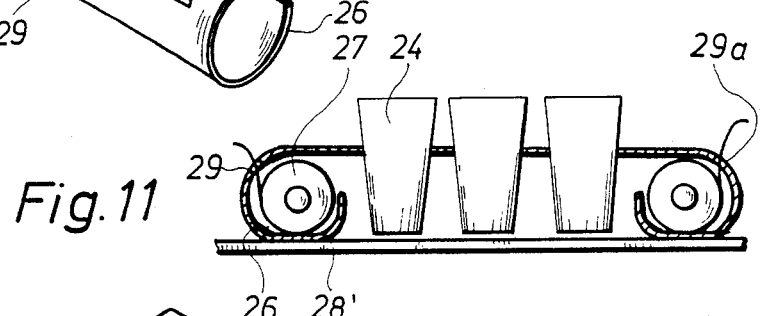
FIG. 11 is a cross-sectional view of the embodiment of FIG. 10, wherein conical cups are indicated in the apertures of the dispensing plate.

FIGS. 10 and 11 illustrate an embodiment of the stand, wherein a container 26 for carriers and an auxiliary container 26a for such carriers are provided immediately below the dispensing plate 22 of the stand. This or these containers are situated relatively close to the apertures 23a of the dispensing plate. These apertures are of such a magnitude that the lower end of the conical objects 24 may reach to the lowermost level of the stand, i.e. to the table 28' on which the stand is situated. As indicated the containers 26 and 26a may be situated adjacent the apertures 23a of the dispensing plate FIG. 11 illustrates a roll 27 of inserted carrier material, and the carriers to be situated on top of the stand for carrying away of conical objects are removed through a slot 29 in the container 26. Correspondingly, the container 26a is provided with a slot 29a.

As indicated in FIGS. 10 and 11, the container 26 and the auxiliary container 26a are formed by the end portions of the dispensing plate 22 being bent downwards and softly curved and subsequently provided with slots 29 and 29a. If necessary the auxiliary container 26a may be omitted.

In the embodiment of the stand illustrated in FIGS. 12 and 13, the container 36 for carriers is also situated immediately below the dispensing plate 32, but this container is now situated parallel to a stop 30 at the end of the dispensing plate. As illustrated, the container 36 is substantially rectangular in cross-section. The cross section may if desired be square. As indicated, the container is provided with a slot 39, through which the carriers may be pulled out and torn off from a roll 37 of such carriers. The pulling out through the slot 39 is as illustrated performed at the arrow A. 34 indicates cups situated in the stand, no carrier, however, yet being situated on top of stand.

The advantage of the stand as illustrated in FIGS. 10 and 11 is that it is particularly easy to manufacture, and carriers are always easily available. The stand may easily be manufactured of hard plastics, e.g. plexiglass or acrylate.

Figure 13:
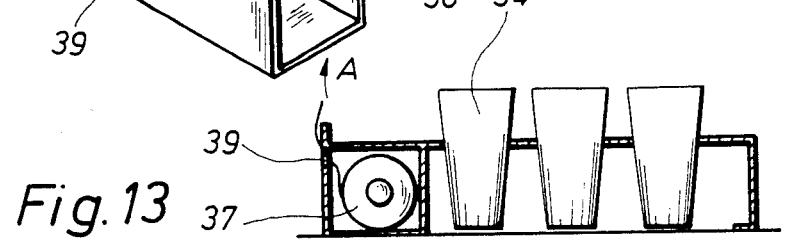
FIG. 13 is a cross-sectional view of the embodiment of FIG. 12, wherein the arrangement of the conical cups is indicated.

The advantage of the stand illustrated in FIGS. 12 and 13 is that it is particularly easy to manufacture and furthermore it is very reliable.

The invention may be varied in many ways without deviating from the scope thereof. The carrier or the stand may for instance on its outer side be provided with appropriate imprints. Furthermore, the number of apertures and the size thereof in the carrier and/or the dispensing plate of the stand may vary.

I claim:

1. A stand for supporting substantially conical objects such as ice-cream cones or disposable cups, and comprising an upper dispensing plate with a plurality of apertures in which the objects may be situated, said upper dispensing plate including side plates, characterized in that said stand farther includes a container for carriers, said carriers provided with apertures for carrying the conical objects, said container adapted to dispense the carriers one by one with the carriers situated on the dispensing plate of the stand before the conical objects are situated on the stand, said container mounted below the dispensing plate in such a manner that the distance between the top side of the container and the underside of the dispensing plate is greater than the distance which the conical objects project below said dispensing plate, and at least one slot in said side plate for the removal of the carriers.

2. A stand as claimed in claim 1, characterized in that the container is formed as a box with an upper side slot, through which the carriers may be pulled out one by one, said carriers being present in a roll within the box, wherein stops are provided at one end of the dispensing plate, whereby each carrier may abut on and be retained by said stops immediately upon its pulling out of the container.

3. A stand as claimed in claim 1, characterized in that the upper or lower part of the slot has a rim which is preferably serrated in order to ease the tear-off of carriers.

4. A carrier preferably for use in connection with the stand (1) as claimed in claim 1, characterized in that it comprises a plate (7, 7a) of bendable material such as cardboard and with a plurality of preferably equally large apertures (13) situated side by side and receiving the conical objects (4) such as ice-cream cones and disposable cups, said plate (7, 7a) being foldable immediately before the carrying away from the stand (1) in such a manner that it is substantially U-shaped in cross section, the cavity of the U facing upwards, and that the free legs of the U comprise handles.

5. A carrier preferably for use in connection with the stand (1) as claimed in claim 1 characterized in that it comprises a plate (7, 7a) of bendable material such as cardboard and with a plurality of perferably equally large apertures (13) situated side by side and receiving the conical objects (4) such as ice-cream cones and disposable cups, said plate (7, 7a) being foldable immediately before the carrying away from the stand (1) in such a manner that it is substantially triangular in cross section, the apex of the triangle facing upwards, and that the free legs of the triangle comprise handles.

6. A carrier as claimed in claim 4, characterized in that it comprises at least two parallel folding lines (14), about which the free legs (16, 17) of the carrier (7, 7a) may be folded substantially into the shape in which it is carried away.

7. A carrier as claimed in claim 4, characterized in that the plate material is of such a nature and the folding lines (14) are formed in such a manner that the free legs (16, 17) of the carrier plate allow a folding of substantially 90° downward relative to the horizontal carrier part and subsequently a folding of substantially 180° in the opposite direction.

8. A carrier as claimed in claim 4, characterized in that an auxiliary folding line (15) is provided on each free leg (16, 17) below each handle hole (19) in such a manner that the outer portions of the free legs (16, 17) may be made abutting each other in a face to face manner when the carrier is carried away (FIG. 6).

9. A carrier as claimed in claim 4, characterized in that the apertures (13) are of a diameter within the range 0.3 to 0.6 times the width of the carrier part (18), and that the rim of each aperture (13) comprises a plurality of cuts for partially allowing the carrier material to clamp each of the objects (4) at their situating within the apertures.

10. A carrier as claimed in claim 4, characterized in that the carrier (7, 7a) is of a laminate of plastics and cardboard, whereby the plastics is sprayed onto the cardboard as a mist.

11. A carrier as claimed in claim 10, characterized in that the ratio of the width of the inner part of the free legs (16, 17) to the width of the carrier part (18) is at least 1.3.

12. A carrier as claimed in claim 4, characterized in that a loose cover plate (28) is provided on the top side of the carrier part (18), said cover plate being of the same dimensions as the carrier part and comprising apertures (23) with their centres at the same places as in the carrier part, said apertures (23), however, being smaller in the cover plate than in the carrier part.

13. A stand for supporting substantially conical objects such as ice-cream cones or disposable cups, and comprising an upper dispensing plate with a plurality of apertures in which the objects may be situated, characterized in that said stand further includes a container for carriers provided with apertures and for carrying away the conical objects, said container adapted to dispense the carriers one by one with the carriers situated on the dispensing plate of the stand before the conical objects are situated on the stand, an auxiliary container for carriers mounted immediately below the dispensing plate and adjacent the apertures of said dispensing plate, the apertures in the dispensing plate being of such a magnitude that they allow the lower ends of the conical objects, when located on the stand, to reach the lowermost level of the stand.

14. A stand for supporting substantially conical objects such as ice-cream cones or disposable cups, and comprising an upper dispensing plate with a plurality of apertures in which the objects may be situated, characterized in that said stand further includes a container for carriers provided with apertures for carrying the conical objects, said container adapted to dispense the carriers one by one with the carriers situated on the dispensing plate of the stand before the conical objects are situated on the stand, said container made of at least one downwardly bent and gently curved part of the dispensing plate, said at least one downwardly bent part provided with longitudinal slots for the removal of carriers from the container.

15. A stand for supporting substantially conical objects such as ice-cream cones or disposable cups, and comprising an upper dispensing plate with a plurality of apertures in which the objects may be situated, characterized in that said stand further includes a container for carriers provided with apertures for carrying the conical objects, said container adapted to dispense the carriers one by one with the carriers situated on the dispensing plate of the stand before the conical objects are situated on the stand, said container having a rectangular cross-section and mounted immediately below a stop at the end of and parallel to the dispensing plate.

* * * * *